US009088627B2

(12) United States Patent
Nelson et al.

(10) Patent No.: US 9,088,627 B2
(45) Date of Patent: Jul. 21, 2015

(54) SYSTEM AND METHOD FOR ACTIVELY CHARACTERIZING A NETWORK

(75) Inventors: Barbara Nelson, San Mateo, CA (US); Roy David Albert, San Jose, CA (US); Blair Thomas Bullock, Pleasanton, CA (US)

(73) Assignee: iPass Inc., Redwood Shores, CA (US)

( * ) Notice: Subject to any disclaimer, the term of this patent is extended or adjusted under 35 U.S.C. 154(b) by 2870 days.

(21) Appl. No.: 11/239,707

(22) Filed: Sep. 29, 2005

(65) Prior Publication Data

US 2007/0073868 A1    Mar. 29, 2007

(51) Int. Cl.
*H04L 29/08* (2006.01)
*H04L 29/06* (2006.01)
*H04W 48/16* (2009.01)
*H04W 48/18* (2009.01)

(52) U.S. Cl.
CPC ............ *H04L 67/36* (2013.01); *H04L 63/0823* (2013.01); *H04L 67/04* (2013.01); *H04W 48/16* (2013.01); *H04L 69/24* (2013.01); *H04W 48/18* (2013.01)

(58) Field of Classification Search
CPC ..... H04L 63/0823; H04L 67/04; H04L 67/36; H04L 69/24; H04L 63/126; H04L 63/205; H04L 69/18; H04W 48/16; H04W 48/18; H04W 12/06; H04W 48/08
USPC .......................................................... 709/237
See application file for complete search history.

(56) References Cited

U.S. PATENT DOCUMENTS

| 5,774,525 | A | 6/1998 | Kanevsky et al. |
| 6,609,198 | B1 | 8/2003 | Wood et al. |
| 6,892,307 | B1 | 5/2005 | Wood et al. |
| 7,213,048 | B1 | 5/2007 | Parupudi et al. |
| 7,296,288 | B1 | 11/2007 | Hill et al. |
| 7,756,082 | B1 | 7/2010 | Dhamdhere |
| 7,889,663 | B1 | 2/2011 | Wright et al. |
| 2002/0029276 | A1 | 3/2002 | Bendinelli et al. |
| 2003/0212909 | A1* | 11/2003 | Chandrashekhar et al. .. 713/201 |
| 2005/0149948 | A1 | 7/2005 | Gupta et al. |
| 2005/0177631 | A1* | 8/2005 | Bahl et al. ...................... 709/224 |
| 2005/0207410 | A1* | 9/2005 | Adhikari et al. ............... 370/389 |

(Continued)

FOREIGN PATENT DOCUMENTS

| EP | 1241838 | 9/2002 |
| EP | 1562324 | 8/2005 |
| WO | WO-2007041351 A2 | 4/2007 |

OTHER PUBLICATIONS

David A. Karp, "Windows XP Annoyances for Geeks", Nov. 16, 2004, O'Reilly Media, Inc. 2nd Edition, Chapter 7, Section 7.5, 19 pages.*

(Continued)

*Primary Examiner* — Michael C Lai
(74) *Attorney, Agent, or Firm* — DeLizio Law, PLLC (57) ABSTRACT

In one embodiment the method includes detecting a network indicator associated with a network, the network provided by a network provider. In one embodiment, after the detecting of the network indicator, the method includes obtaining from the network provider an actual attribute associated with the network. The method may also include determining, based on stored network information, whether the actual attribute matches an expected attribute for the network. If the actual attribute matches the expected attribute, the method may classify the network into one of a plurality of network classes.

20 Claims, 7 Drawing Sheets

(56) References Cited

U.S. PATENT DOCUMENTS

| | | | |
|---|---|---|---|
| 2006/0094400 A1* | 5/2006 | Beachem et al. ............. | 455/410 |
| 2006/0174035 A1 | 8/2006 | Tufail | |
| 2006/0187873 A1 | 8/2006 | Friday et al. | |
| 2008/0049702 A1 | 2/2008 | Meylan et al. | |
| 2009/0028120 A1 | 1/2009 | Lee | |
| 2011/0208866 A1 | 8/2011 | Marmolejo-Meillon et al. | |
| 2013/0109313 A1 | 5/2013 | Kneckt et al. | |
| 2013/0150012 A1 | 6/2013 | Chhabra et al. | |
| 2014/0185469 A1 | 7/2014 | Marmolejo-Meillon et al. | |

OTHER PUBLICATIONS

"International Application Serial No. PCT/US06/38155, International Search Report mailed Dec. 31, 2007", 5 pgs.

"International Application Serial No. PCT/US06/38155, Written Opinion mailed Dec. 31, 2007", 4 pgs.

"European Application No. EP06815855 Supplementary EP Search Report", Feb. 4, 2013 , 7 pages.

"European Application No. EP06815855 Supplementary EP Search Report Notification", Feb. 21, 2013, 1 page.

"U.S. Appl. No. 13/004,821 Office Action", Dec. 7, 2012, 12 pages.

"U.S. Appl. No. 13/004,821 Final Office Action", May 9, 2013, 10 pages.

"U.S. Appl. No. 13/732,226 Office Action", Nov. 25, 2014, 10 pages.

"European Application No. 06815855.9 Communication pursuant to Article 94(3) EPC", Jan. 9, 2015, 6 pages.

* cited by examiner

SYSTEM AND METHOD FOR ACTIVELY CHARACTERIZING A NETWORK

BACKGROUND

1. Field

Embodiments of the invention relate generally to the field of computer networking and more particularly to systems and methods for characterizing communication networks.

2. Description of Related Art

In today's computing environment, there are many broadband networks, such as free networks, enterprise networks, public hotspots, hotel broadband networks, home networks, etc. These networks typically provide extensive connectivity and high data transfer rates. However, the availability of numerous networks can pose security risks and management difficulties. For example, attackers can set-up rogue network access points that appear to provide access to legitimate networks. In the course of providing access to illegitimate networks, the attackers may have an opportunity to steal data, delete data, spread viruses, etc.

Because of the multitude of available networks, users often resort to using multiple connection clients for connecting with multiple networks. As result, connecting to different networks is rarely seamless and often requires user intervention. Having numerous connection clients can consume considerable system resources and often causes user confusion and frustration. As a result, there is a need for a system for securely and easily connecting to networks.

SUMMARY

Apparatuses and methods for actively characterizing networks are described herein. In one embodiment, the apparatus includes a detection unit to detect a network indicator associated with a network. The apparatus can also include a classification unit to classify the network into one of a plurality of classes, where the classification is based on the network indicator and stored network information. The apparatus can also include a characterization unit to interact with the network and to verify whether the network is correctly classified in the one of the plurality of network classes.

In one embodiment the method includes detecting a network indicator associated with a network, the network provided by a network provider. In one embodiment, after the detecting of the network indicator, the method calls for obtaining from the network provider an actual attribute associated with the network. The method can also call for determining, based on stored network information, whether the actual attribute matches an expected attribute for the network. If the actual attribute matches the expected attribute, the method can call for classifying the network into one of a plurality of classes.

BRIEF DESCRIPTION OF THE FIGURES

The present invention is illustrated by way of example and not limitation in the Figures of the accompanying drawings in which.

DESCRIPTION OF THE EMBODIMENTS

Apparatuses and methods for actively characterizing networks are described herein. This description of the embodiments is divided into four sections. The first section provides an introduction, while the second section describes an example system architecture and operating environment. The third section describes example operations and the fourth section provides numerous implementation details. The fifth section provides some general comments.

Introduction

This section provides an introduction to embodiments of a connection management system that characterizes networks. Additional features of the system will be provided below, in the following sections.

Figure 1:
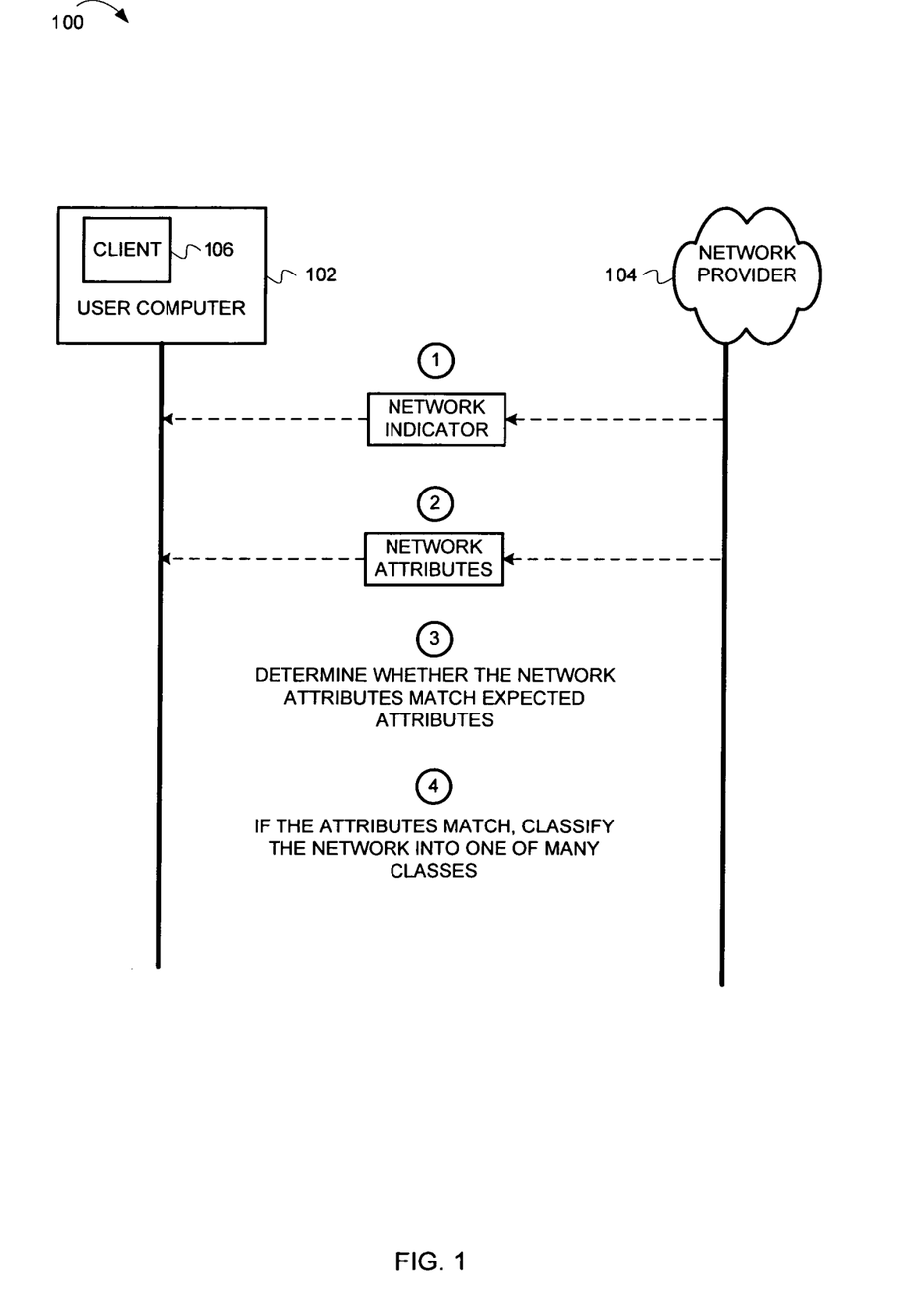
FIG. 1 is a dataflow diagram illustrating communications and operations performed by a network connection management system.

FIG. 1 is a dataflow diagram illustrating communications and operations performed by a network connection management system. The system 100 detects networks and characterizes detected networks as trusted, untrusted, or semi-trusted networks. The system does not simply rely on a network provider's identifier when characterizing an available network. Instead, embodiments of the system 100 leverage network connection and/or authentication information for determining whether a network is trusted, untrusted, or semi-trusted. In some embodiments, as the system 100 uses more information to characterize an available network, the more reliable its characterization becomes. In some embodiments, if the system 100 classifies a network as untrusted, it can perform additional operations for determining what services the network might support.

FIG. 1 shows a user computer 102 and a network provider 104. The user computer 102 includes a client 106, which manages network connections with the network provider 104 and other network providers (not shown).

The communications and operations of FIG. 1 occur in four stages. At stage 1, the client receives a network indicator from the network provider 104. For example, in a wireless environment, the network provider 104 may broadcast packets indicating its presence. These broadcast packets can include broadcast service set identifiers (SSIDs) and other information identifying the network provider 104.

At stage 2, after the client 106 detects the network provider 104, the client 106 receives network attributes from the network provider 104. The network attributes can help to reliably identify the network provider, and define the capabilities of the network. The client 106 may receive network attributes without establishing a connection with the network provider 104. As a result, the client 106 will not expose the user computer 102 to security risks (e.g., attackers) lurking on the network provider's network. However, the client 106 may receive network attributes by establishing a limited network connection with the network provider 104. The data flow continues at stage 3.

At stage 3, the client 106 determines whether the network attributes match those it expects from the network provider 104.

At stage 4, the client 106 characterizes the network based on whether the network attributes match expected attributes. The client can characterize the network as a trusted network, untrusted network, or other network type. If the attributes do not match, the client 106 may characterize the network provider 104 as an untrusted or semi-trusted network. After characterizing a network, the client 106 can preclude connections to untrusted networks, connect with trusted networks, display the presence and characterization of networks, etc. In one embodiment, after characterizing a network as untrusted or semi-trusted, the client 106 can take additional measures to further classify the network.

Hardware, Operating Environment, and System Architecture

This section describes an example system architecture and example hardware that can be used with embodiments of the invention. Operations of the system components will be described in the next section.

Example System Architecture

Figure 2:
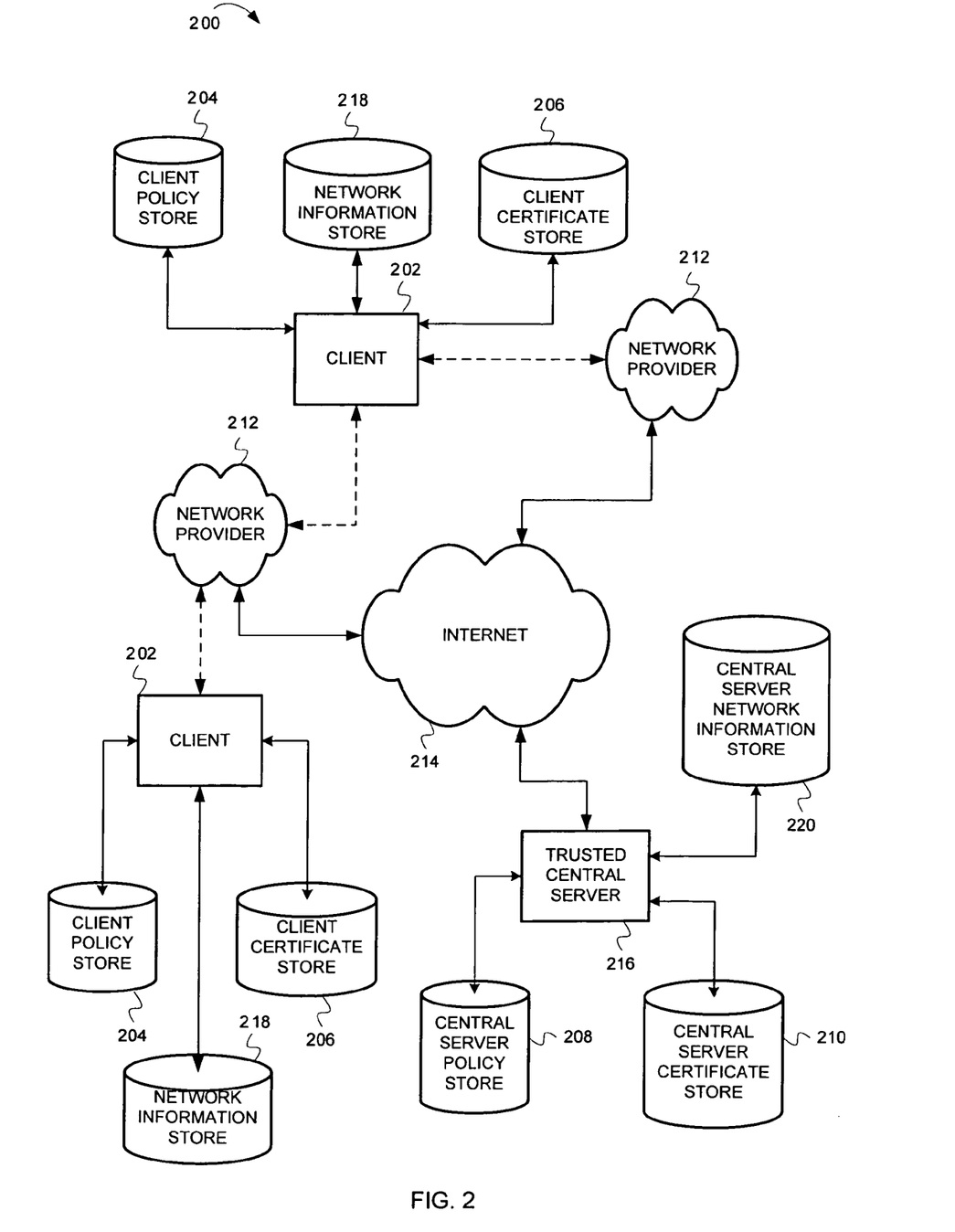
FIG. 2 is a block diagram illustrating a system for detecting and characterizing networks, according to example embodiments of the invention.

FIG. 2 is a block diagram illustrating a system for managing and characterizing network connections, according to example embodiments of the invention. As shown in FIG. 2, the system 200 includes a plurality of clients 202, where each client 202 can communicate with one or more network providers 212. Each client 202 is connected to its own client policy store 204, network information store 218, and client certificate store 206. As described herein, the clients 202 can detect available networks and determine whether those networks are trusted, untrusted, or semi-trusted networks. The clients 202 can also display detected networks to a user and perform other operations.

In one embodiment, the clients 202, client policy stores 204, network information stores 218, and client certificate stores 206 reside on user computers (e.g., desktop computers, laptop computers, personal digital assistants, etc.). In another embodiment, the clients 202 reside on a user computer, while the other components reside elsewhere.

The network information stores 218 can include connection information, authentication information, and other attributes about networks to which a client 202 may connect. The client certificate stores 206 can include information used by the clients 202 for authenticating identity certificates received from network providers. The client policy stores 204 can include client policies governing when the clients 202 should automatically connect to a third-party network, when the clients 202 should display detected networks, and other connection management tasks.

The network providers 212 and a trusted central server 216 are connected to an internet 214. The trusted central server 216 is also connected to a central server policy store 208, central server certificate store 210, and a central server network information store 220. The central server policy store 208, central server certificate store 210, and central server network information store 220 are central repositories for policies, certificates, and network information, respectively. The network providers 212 can include any suitable hardware and/or software (e.g., access points and related software) for providing access to the internet 214 and other networks (not shown).

Any of the components of the system 200 can include machine-readable media including instructions for performing operations described herein. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc. According to embodiments of the invention, the components described herein can be other types of logic (e.g., firmware or digital logic) for executing operations for managing network connections.

Figure 3:
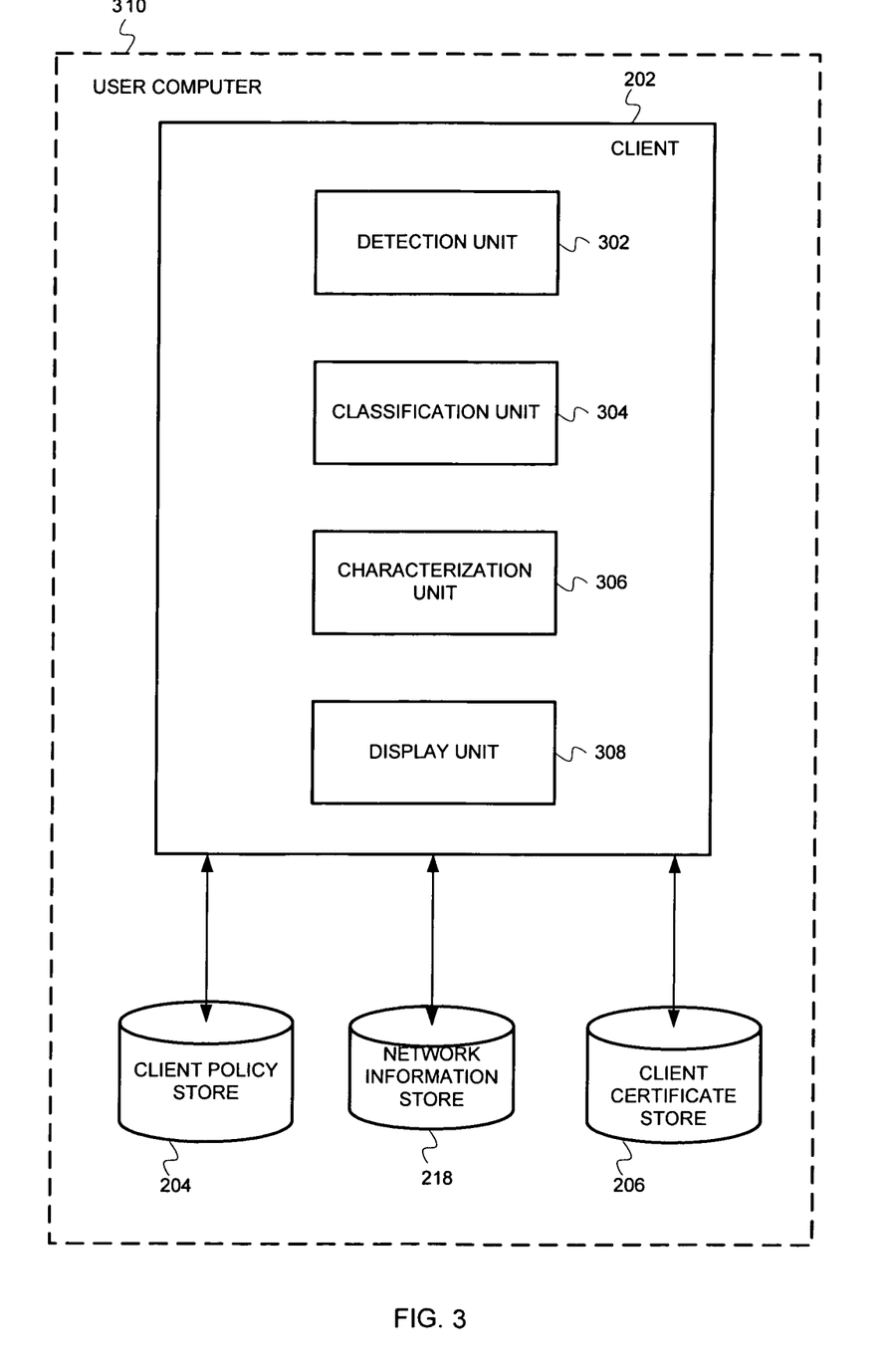
FIG. 3 is a block diagram illustrating components of a client, according to example embodiments of the invention.

While FIG. 2 describes an example system architecture, FIG. 3 describes a more detailed embodiment of the clients 202. FIG. 3 is a block diagram illustrating components of a client, according to example embodiments of the invention. In FIG. 3, the client 202 includes a detection unit 302, classification unit 304, characterization unit 306, and display unit 308. In the embodiment shown in FIG. 3, the client 202, client policy store 204, network information store 218, and client certificate store 206 reside within a user computer 310. In another embodiment, the storage components reside outside the user computer 310, where they are accessible to the client 202.

The detection unit 302 can detect the presence of available networks and the classification unit 304 can classify detected networks into one of a number of network classes (e.g. trusted, untrusted, semi-trusted, etc.), while the characterization unit 306 can determine whether networks have been properly classified. The display unit 308 can determine which of the available networks to display to a user.

Example Hardware and Operating Environment

Figure 4:
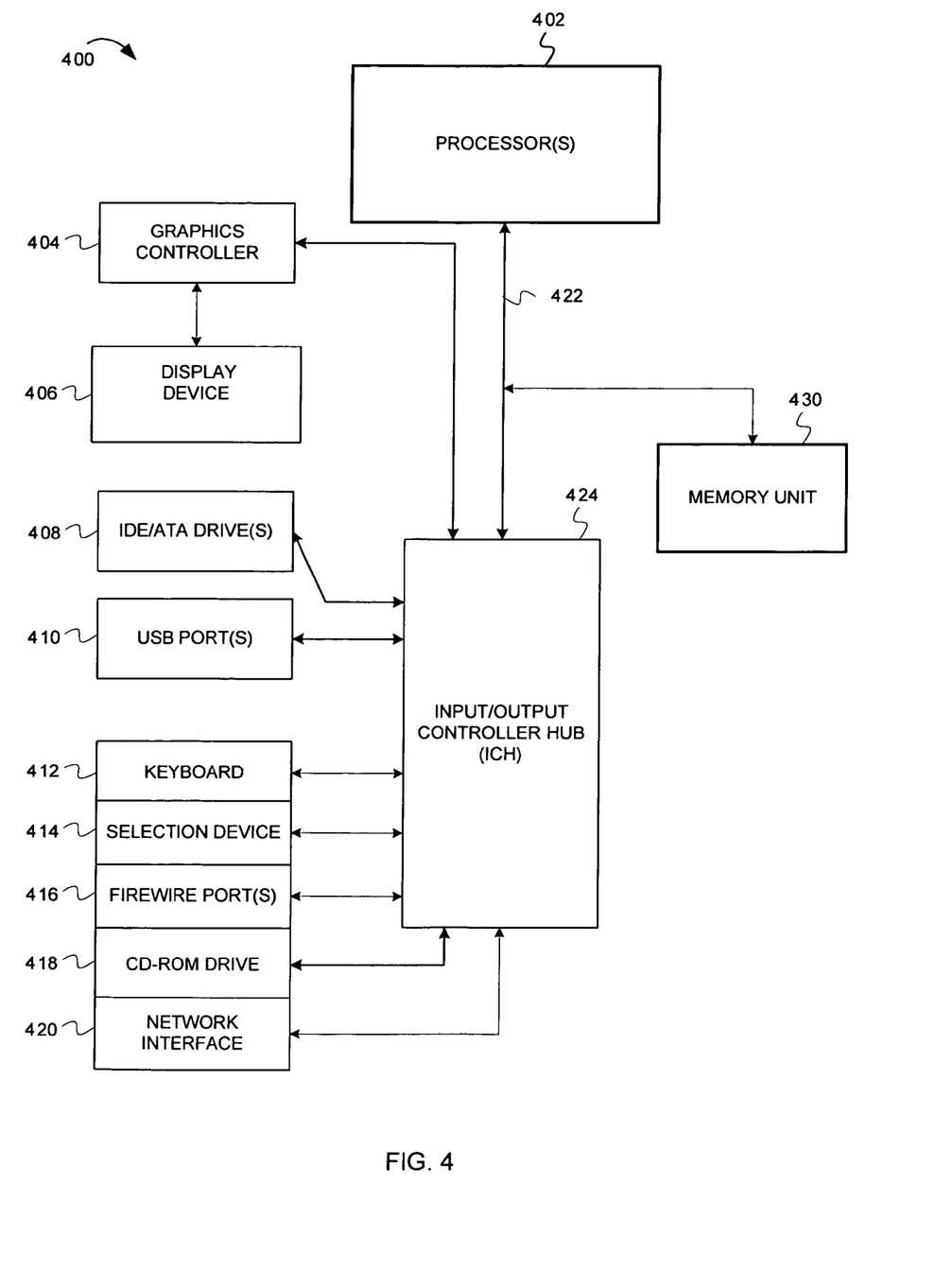
FIG. 4 illustrates an example computer system used in conjunction with certain embodiments of the invention.

FIG. 4 illustrates an example computer system used in conjunction with certain embodiments of the invention. For example, the computer system 400 can be employed as a user computer 310, client 202, trusted central server 216, or other component of the systems described herein.

As illustrated in FIG. 4, the computer system 400 comprises processor(s) 402. The computer system 400 also includes a memory unit 430, processor bus 422, and Input/Output controller hub (ICH) 424. The processor(s) 402, memory unit 430, and ICH 424 are coupled to the processor bus 422. The processor(s) 402 may comprise any suitable processor architecture. The computer system 400 may comprise one, two, three, or more processors, any of which may execute a set of instructions in accordance with embodiments of the present invention.

The memory unit 430 includes an I/O scheduling policy unit 432 and I/O schedulers 434. The memory unit 430 stores data and/or instructions, and may comprise any suitable memory, such as a dynamic random access memory (DRAM), for example. The computer system 400 also includes IDE drive(s) 408 and/or other suitable storage devices. A graphics controller 404 controls the display of information on a display device 406, according to embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For one embodiment of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, a mouse 414, a CD-ROM drive 418, one or more suitable devices through one or more firewire ports 416. For one embodiment of the invention, the ICH 424 also provides a network interface 420 though which the computer system 400 can communicate with other computers and/or devices.

In one embodiment, the computer system 400 includes a machine-readable medium that stores a set of instructions (e.g., software) embodying any one or all of the methodologies for characterizing networks described herein. Furthermore, software can reside, completely or at least partially, within memory unit 430 and/or within the processor(s) 402.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

In this section, FIGS. 5-7 will be discussed. In particular, FIG. 5 describes general operations for detecting, classifying, and characterizing available networks. FIG. 6 describes specific operations for classifying available networks and FIG. 7 describes specific operations for characterizing available networks. The figures will be described with reference to the block diagrams discussed above (see FIGS. 2-4).

Figure 5:
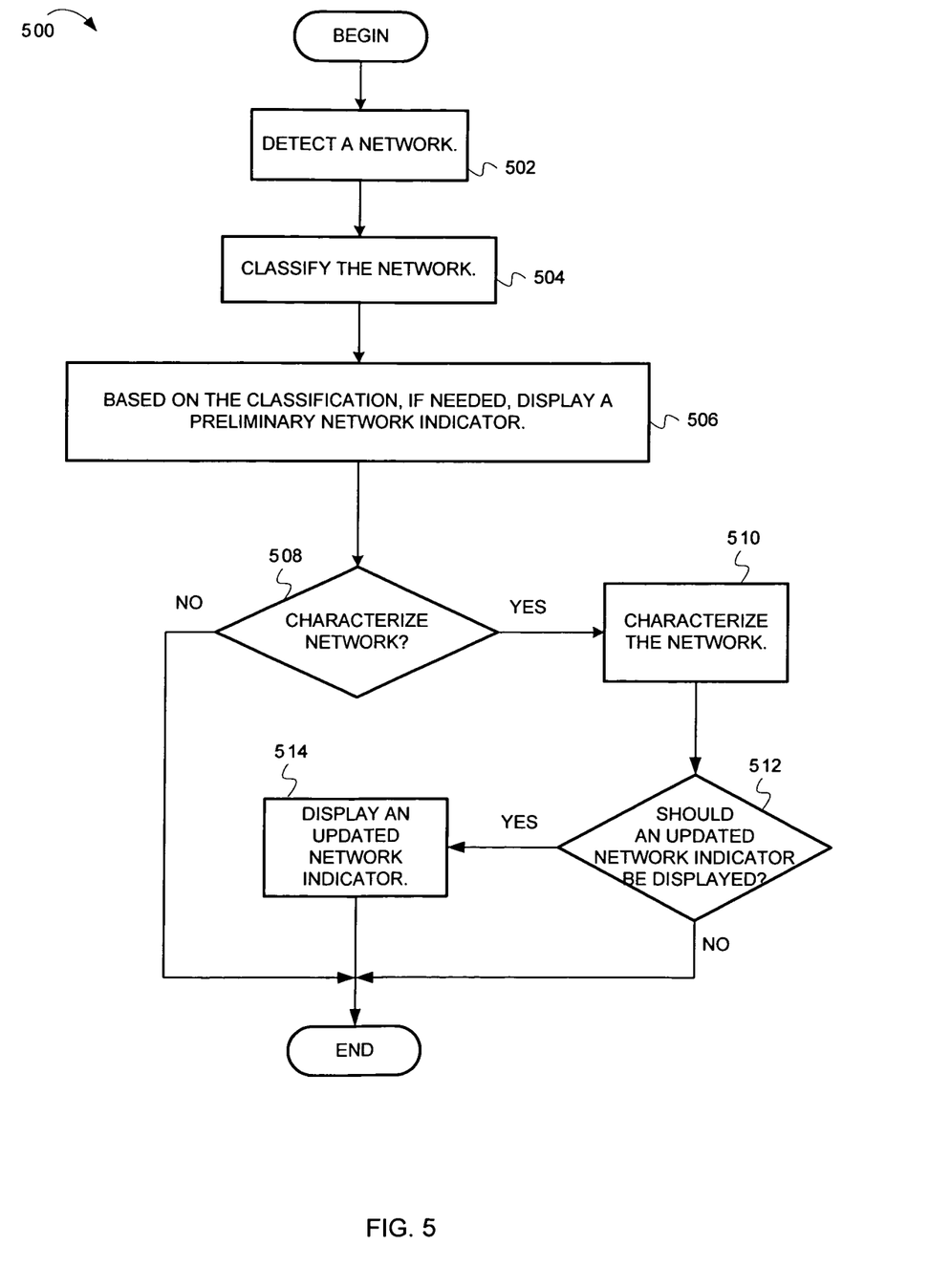
FIG. 5 is a flow diagram illustrating operations for detecting, classifying, and characterizing available networks, according to example embodiments of the invention.
Figure 6:
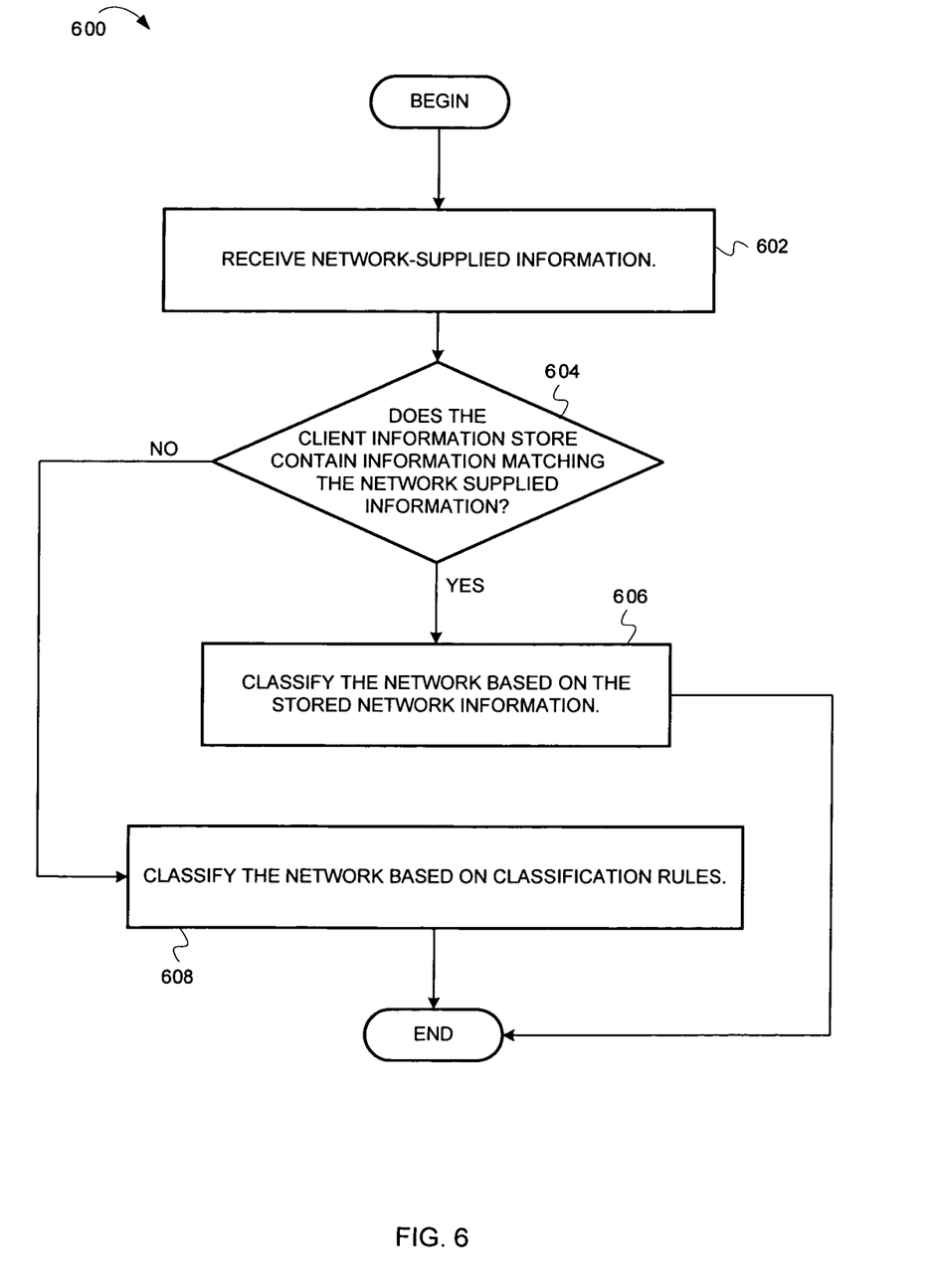
FIG. 6 is a flow diagram illustrating operations for classifying a network, according to example embodiments of the invention.

FIG. 5 is a flow diagram illustrating operations for detecting, classifying, and characterizing available networks, according to example embodiments of the invention. The flow diagram 500 commences at block 502.

At block 502, a network is detected. For example, the client's detection unit 302 detects an available network. In one embodiment, the client's detection unit 302 detects broadcast beacons, which include the network provider's SSID. The flow continues at block 504.

At block 504, the available network is classified. For example, the client's classification unit 304 classifies the available network into one of a number of classes. In one embodiment, the classification is based on the SSID detected at block 504. In one embodiment, classes include public access networks (semi-trusted), known private networks (trusted), discovered corporate networks (semi-trusted), and untrusted networks. Additional details about network classification are discussed below in the description of FIG. 6. The flow continues at block 506.

At block 506, based on the classification, a preliminary network indicator is displayed, if needed. For example, the client's display unit 308 presents an indication of the available network and its classification in a graphical user interface. In another embodiment, the display unit 308 does not present an indication of the available network and classification. The display unit 308 can determine whether to display a preliminary network indicator based on policies in the client policy store 204. For example, according to one policy, the display unit 308 only displays trusted networks, while according to other policies, the display unit 308 may display all networks. The flow continues at block 508.

At block 508, a determination is made about whether to characterize the network. For example, the characterization unit 306 determines whether it should characterize the detected network. In one embodiment, based on client policies, the characterization unit 306 does not characterize networks that have been classified as untrusted. If the client 202 will characterize the network, the flow continues at block 510. Otherwise, the flow ends.

At block 510, the network is characterized. For example, the client's network characterization unit 306 characterizes the network. In one embodiment, characterizing the network includes using additional information received from the network provider to confirm whether the network was properly classified. In one embodiment, if the network was improperly classified, the characterization unit 306 reclassifies the network. Network characterization is described in greater detail below, in the discussion of FIG. 7. The flow continues at block 512.

At block 512, a determination is made about whether an updated network indicator should be display. For example, based on client policies or other information, the display unit 308 determines whether it should display an updated network indicator. In one embodiment, if the client 202 reclassified the network during characterization (at block 510), the client 202 may present an updated indication of the network and its classification. If an updated network indicator will be displayed, the flow continues at block 514. Otherwise, the flow ends.

At block 514, an updated network indicator is displayed. For example, the display unit 308 displays in a graphical user interface an updated network indicator, which indicates a network's availability and classification. From block 514, the flow ends.

While FIG. 5 describes general operations for detecting, classifying, and characterizing available networks, FIG. 6 describes classifying networks in greater detail.

FIG. 6 is a flow diagram illustrating operations for classifying a network, according to example embodiments of the invention. The flow diagram 600 commences at block 602.

At block 602, network-supplied information is received. For example, the detection unit 302 receives information supplied by the network. In one embodiment, the detection unit 302 can receive an SSID or BSSID. The flow continues at block 604.

At block 604, a determination is made about whether the network information store 218 contains information matching the network-supplied information. For example, the classification unit 304 queries the network information store 218 for an SSID matching the network-supplied SSID. If the network information store 218 contains information matching the network-supplied information, the flow continues at block 606. Otherwise, the flow continues at block 608.

At block 606, the network is classified based on information contained in the network information store 218. For example, the classification unit 304 classifies the network into one of the plurality of classes based on a match between information in the network information store 218 and the network-supplied information. In one embodiment, if the classification unit 304 finds a matching SSID in the network information store 218, it classifies the network according to stored information associated with the SSID. The classes include semi-trusted, untrusted, and trusted networks. Other embodiments can include additional and/or different classifications. From block 606, the flow ends.

At block 608, the network is classified based on classification rules. For example, classification unit 304 classifies the network based on policy rules stored in the client policy store 204. The policy rules may dictate that known networks are classified as trusted, whereas unknown networks are classified as untrusted. From block 608, the flow ends.

Figure 7:
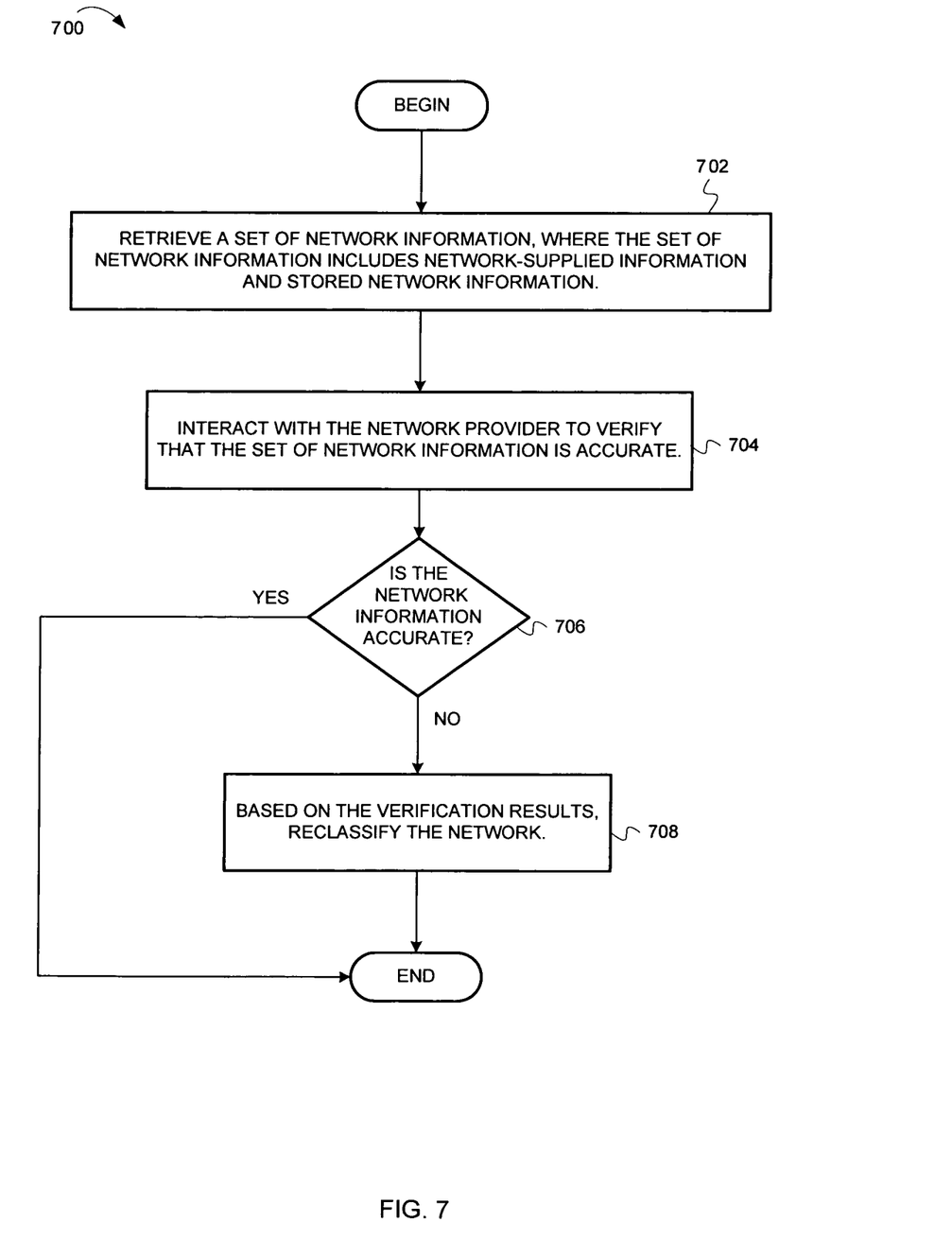
FIG. 7 is a flow diagram illustrating operations for characterizing a network, according to example embodiments of the invention.

While FIG. 6 describes details about network classification, the discussion of FIG. 7 will describe network characterization in greater detail.

FIG. 7 is a flow diagram illustrating operations for characterizing a network, according to example embodiments of the invention. The flow diagram 700 commences at block 702.

At block 702, information about the network is retrieved. For example, the characterization unit 306 retrieves information about the network from the network information store 218. The information can include the network's SSID, media access control address, wireless encryption protocol key, WiFi Protected Access information, and identity certificates. The flow continues at block 704.

At block 704, the network information is verified by interacting with the network provider. For example, the characterization unit 306 interacts with the network to verify that the network information is accurate. In one embodiment, the characterization unit 306 interacts with the network provider without establishing a connection to the network. For example, the characterization unit 306 can receive network attributes, such as a media access control address, wireless encryption protocol key, WiFi Protected Access capability set, etc. without establishing a connection between the client 202 and the network provider's network. In another embodiment, the characterization unit 306 receives network information by establishing a limited network connection with the network provider's network. After establishing a limited connection, the characterization unit 306 may request and receive an identity certificate from the network provider 212. In other embodiments, the characterization unit 306 obtains other network information suitable for characterizing the network. The flow continues at block 706.

At block 706, a determination is made about whether the network information is accurate. For example, the characterization unit 306 compares the network attributes acquired from interacting with the network information retrieved at block 702. In one embodiment, if the information matches, the network information is accurate. If the information is accurate, the flow ends. Otherwise, the flow continues at block 708.

At block 708, the network is reclassified. For example, based on the accuracy of the network information, the characterization unit 306 reclassifies the network into another of the plurality of classes. In one embodiment, if some of the information is not accurate, the characterization unit 306 reclassifies the network from trusted to semi-trusted or untrusted. From block 708, the flow ends.

After a client performs some or all of the operations described above, it can establish a connection with a network provider. After establishing a connection with the network provider's network, the client can determine and report additional characteristics (e.g., quality of service, available services, etc.) about the network provider's network. For example, the client can probe the network to determine whether certain ports are open for establishing a virtual private network tunnel or determine whether certain protocols are supported. In one embodiment, based on the additional characteristics the client can perform post-connect actions. For example, the client can present these findings to users through a graphical user interface.

Implementation Details

This section will describe various implementation details about network detection, network classification, and network characterization. While this section describes implementation details of some embodiments, other embodiments of the invention can be implemented differently.

Network Detection

Some embodiments of the invention leverage Adapter and Link Discovery, Wi-Fi Network Detection/Discovery, and Wi-Fi Network Classification in detecting available networks. While the client 202 is in an Offline and Disconnected state, it can constantly discover networks and network media links. While running, the client 202 can maintain control of all network connections enabled for use, and therefore can identify and classify available broadband network connections using any and all means available.

The client 202 can discover Broadband networks based upon one or many combinations of network and adapter conditions, NIC media detection, availability of IP services such as HTTP and detecting or soliciting for the broadcast beacons of available wireless networks over the air.

For non Wi-Fi Broadband services, such as Wired Broadband over Ethernet or corporate LAN services, adapter physical layer link detection provides the initial trigger for network service detection where no external network identifiers or characterization elements are available, such as an SSID.

For Wi-Fi services, often the SSID can be used to isolate networks prior to network characterization and qualification. Broadcast SSIDs can be detected by a Wi-Fi supplicant while it is in an offline unassociated/unauthenticated state. This network detection methodology, based on simple SSID detection, provides a "hint" of network availability, but can not be fully relied upon to establish service trust. Furthermore, the broadcast of SSID can not always be relied upon to detect network availability. Therefore, multiple methods should be used to enumerate, isolate and pre-qualify available network providers.

Wi-Fi network detection can be achieved using Passive Scanning, Active Scanning, or SSID Aliasing.

Passive Scanning

Passive Scan network detection relies upon the Wi-Fi beacons broadcast by each AP. Networks are qualified by matching the SSID contained in those beacons to a list of known serviceable SSIDs. This method of network detection can be done without associating to the Access Point or operating directly on the Client NIC, but unless other data contained in the beacon is used in combination with the SSID to further qualify the network (such as BSSID), this method should be considered unreliable to isolate serviceable trusted networks. The SSID configuration of Access Points is intended to merely be a "hint" and further qualification of the network is required.

Active Scanning

In cases where the SSID is not broadcast and passive network detection is not an option, an active scanning method must be used. This methodology assumes two distinct scenarios: 1) There is a broadcast SSID in the beacon, just not the SSID that is desired. The SSID with the desired capability set is not broadcast, but is available on the same radio as the broadcast SSID. 2) There is no SSID broadcast.

Scenario 1 is most prevalent in Public Access networks that have provisioned separate 802.1X/WPA services on existing APs that may only broadcast a single SSID which is already used for another service. An example of this is T-Mobile's WPA service. This feature is called "aliasing" since the single broadcast is used as a "hint" to detect and pre-classify the network, but a second SSID "alias" is actually used to physically connect to the network for purposes of user access or characterization in addition to the broadcast SSID. Aliasing exposes potentially multiple networks from a single 802.11 beacon's SSID.

A primary example of scenario 2 where Active Scan network detection methods are necessary is in the Enterprise where the administrator has decided not to broadcast the SSID for security reasons. Typically the SSID is known and is manually provisioned and activated on the user's station in order to associate with the network. For purposes of automation, the client 202 "probes" the air with the desired SSID and determine whether there is a response to that poll by an available Access Point. This feature is SSID probing.

SSID Aliasing

It should be clearly noted here that the Aliasing method of network detection and selection does have certain limitations and side-effects. The most notable are: 1) Since the Access Point only maintains a single BSSID (radio MAC), the beacon carries capability set information, such as WPA, for all SSIDs, both hidden and broadcast. Some of this information may be misleading for one of the networks being represented. A basic Open UAM system will be detected by a WPA-enabled card as WPA-enabled even though it is not supported by the principle UAM SSID which is broadcasting the beacon. Older connection clients may ignore WPA beacons, but newer connection clients that enforce WPA connectivity may become confused unless they know that there is another SSID alias particular to that feature which must be accessed. 2) Since multiple authentication protocols are provided by co-existent networks, each network type should be characterized and classified independently and presented as distinct networks, once sufficiently validated, for purposes of network selection. Each entry would then contain indicators of the network's capabilities as a reflection of the capability set detected by the beacon and further verified by the characterization phases.

In an aliased network with multiple capabilities, if both network types are available, but for some reason the more efficacious and secure method is unavailable, the connection client has the opportunity to leverage the remaining method to connect the user in some form of fail-over. In some cases, due to feature support or hardware/software compatibility, the client 202 may characterize the network via the EAP channel on one SSID while only displaying the other network SSID as available in the Network Selection Screen.

Network Classification

The network detection phase forms the initial network isolation using external beacon information and responses to associative requests for the purposes of SSID enumeration and network classification. This can be followed by more extensive network characterization and validation. In one embodiment, the client 202 "bucketizes" detected networks into several classes of service for prioritization in the network characterization phase: Public Access Networks (semi-trusted), Known Private Networks (trusted), Discovered Corporate Networks (semi-trusted), Unknown networks (un-trusted). Based upon the information gathered and referenced during network detection, the client 202 may display the networks as available without further characterization or may optionally perform more invasive characterizations on these 'available' networks to validate their authenticity.

For unknown networks that provide an IP address and allow verifiable access to the internet, the client 202 can classify these connections and display them as available for network selection. However, promiscuous attachment to unknown and untrusted networks can exposes the user computer running the client 202 to active internet connections without an authentication event. Immediately available internet connections may compromise the user's station during innocent network characterization and therefore should be interfaced with carefully and only while the station is in a protected IP-isolated state with appropriate security applications such as Personal Firewall and AntiVirus software running. Furthermore, since DHCP negotiation and IP availability detection require association and physical connection to the Access Point, any unrecognized network should be characterized fully prior to displaying it as available to the user for network selection.

Network Characterization

Once available networks have been detected and classified, the client 202 can further characterize the networks to verify service availability. Using the beaconed SSID or active scan network detection as a foundation, a series of optional pre-connection network characterization operations, from least-to-most invasive, may be performed on the network to absolutely qualify the network as a trusted service endpoint and verify any assumptive information carried in the network information store 218, such as the validity of a WEP (Wired Equivalent Privacy) key required to connect or the presence of 802.1X.

The authenticity of the available network may be confirmed by leveraging the Public Key Infrastructure (PKI) certificate information presented in both https-based and tunneled 802.1X AAA methods. The primary condition for absolutely determining a network provider is based on availability of an 802.1X EAP Service on the trusted central server 216 with a valid Certification Authority on a known SSID "hint" or a combination of SSID, IP and valid https responses. This level of service validity indicator requires "Characterization" of the network which may require physical connection to the network with varying degrees of potential invasiveness. The same methods for detecting and classifying public access networks can be extended to corporate networks, without a trusted central server 216, by leveraging the EAP support of the Home Authentication Server directly with no mediated transport.

This characterization phase may require brief systematic associations to the detected and pre-qualified networks to elicit further disclosure of the network's capabilities and authenticity credentials. Depending on the needs of the user and the level of acceptability to more invasive characterizations, each characterizing function may be enabled, disabled or combined to provide a sufficient level of confidence in the detected service. In one embodiment, characterization of networks should only be performed on "known" SSIDs which have been identified through passive or active scan recognition methods. Often there may be multiple criteria required to match in addition to the SSID to establish a high-confidence of service availability and as such, there must be careful consideration of how the client 202 identifies and operates on an individual SSID.

In one embodiment, the SSID is merely a "hint" which indicates possible service. In one embodiment, the SSID alone is not used as the foundation for decision-making without further correlating network information and networking events. Network characterization may take a few seconds for each detected network. If the user requests a network connection before the characterization has been completed, in one embodiment, all characterization may be suspended, to enable the user to connect immediately.

Pre-connect network characterization can be initiated based upon the assumption that the SSID identified during network detection, either by active or passive method, is a valid and recognized network. However, due to the inaccuracy of using the SSID alone as an indication of network availability, supplemental network characterization verifies the authenticity of the SSID as a trusted service endpoint and verifies the network's expected characteristics. For example, if the client 202 expects this SSID to use 802.1X (which is not readily identifiable by any beacon information element other than WPA), the characterization phase can confirm that 802.1X is supported prior to the user-initiated connection request.

The actual mechanics of network characterization depend on what type of network is detected from the information gathered during network detection combined with what is expected from the network and/or pop data carried in the client. Certain network characterizations such as corporate certificate validation require 802.1X while others may merely logically confirm the validity of client data, such as WEP keys and basic 802.1X support.

Certain network characterizations may be performed optionally depending on the needs of the client and network type being connected to. An example of this would be only checking for an enterprise Certificate Authority (CA) certificate if there is a private directory entry for the enterprise WLAN. The following are examples of systematic network characterizations that may be used in logical combination to qualify and validate the authenticity of a network or connection type independently of the SSID broadcast in the network beacon: WPA service, 802.1X Detection, DHCP/IP Discovery, GIS Detection (HTTP), Detecting Wired Broadband Service Availability, Shared WEP Detection & Verification, RADIUS NAI, and Peering Discovery Certificate Availability and Authenticity Check, and Enterprise Certificate Availability and Authenticity Check.

Generic Interface Specification (GIS) is an https-based authentication method supported by many public access broadband network providers, to enable users of connectivity clients to automatically connect to a broadband provider, without requiring the user to wade through a set of web pages.

WPA Service Availability

Wi-Fi Protected Access (WPA) consists of a suite of protocols: 802.1X Authentication, Temporal Key Integrity Protocol (TKIP) WEP key rotation, Per-frame Message Integrity Check (MIC) and replay protection via MICHAEL.

WPA has a distinct capability element broadcast in the radio's broadcast beacon. When the WPA "security bit" is detected, a number of assumptions can be made: 1) The Wi-Fi network is an OPEN ESS Infrastructure mode network. 2) It is not necessary to set a WEP key in order to associate with the network 3) 802.1X Authentication is present. 4) The Wi-Fi NIC is capable of detecting WPA and therefore supports TKIP. 5) The WPA-enabled Wi-Fi NIC will only connect to a WPA-enabled Access Point. 6) The WPA network requires, and enforces, WPA associations only.

As noted in the previous section, when WPA is combined with Universal Access Method (UAM) based systems that rely on a "shadowed" SSID on a single BSSID or Access Point radio, the WPA information element may be detected on the UAM broadcast beacon, but is actually not available as a service unless the client attaches to the proper SSID alias. As such, in one embodiment, the client 202 can characterize WPA networks in the same manner as WEP and GIS in order to verify that the underlying assumptions specified above actually hold true. A WPA enabled Access Point that broadcasts the WPA capability in the beacon should be characterized to determine if 802.1X is present, since if not, then it is definitely not the correct SSID and the WPA service may be delivered on another unknown SSID, regardless of the fact that the network is OPEN. Further characterization of the OPEN network will most likely uncover an HTTP redirect and potential GIS Reply Messages.

If 802.1X is detected, then there is a much higher likelihood that WPA is enabled since it is OPEN and maintains support for 802.1X; an unlikely combination in any other circumstance. If WPA is enabled, absolute adherence to WPA controls must be enforced during the network connection to mitigate downwardly-negotiable security attacks. However, the well-established WPA capability provides for further characterization of the network via the EAP channel unambiguously.

802.1X Detection

It should be clearly noted that 802.1X is intended for use with LAN as well as WLAN adapters. 802.11 wireless association events and SSIDs do not exist in wired LAN making it far more difficult to proactively identify and classify. However, both Wireless and Wired LAN services share some common protocols and authentication methods such as Point to Point Protocol Over Ethernet, 802.1X and GIS and therefore should be considered together from a characterization standpoint, event though they each may have a different set of Media, Network and Service detection rules.

In one embodiment, for network SSIDs classified as corporate or public access networks which utilize 802.1X for authentication, immediate verification of the network's EAP capabilities can be achieved. By associating to the network (or detecting a media attachment event to an Ethernet adapter) and issuing an EAPOL-START, if an 802.1X Identity Request is received, the network supports 802.1X. The client 202 may stop here or may further qualify the network with other suitable characterization operations.

DHCP/IP Discovery

If a wired Ethernet or wireless adapter does not successfully complete an 802.1X detection, then it may be logically followed that there is either no link-layer AAA service available using the attempted method (WEP, 802.1X, PPPOE) or the network is open to the internet or filtered by some form of Access Gateway which relies on Layer 3 such as UAM or GIS. Therefore an IP Discovery via the DHCP protocol should be performed to assess network transport availability. If a broadband adapter successfully negotiates DHCP and receives an IP address, it may be inferred that the network is Open and has Internet access or GIS controlled access and therefore these tests should be performed.

GIS Detection

In one embodiment, for known Wi-Fi networks classified as Public Access and simple unknown Ethernet connections detected by an Adapter media connection, logical detection and verification of GIS can be performed. Both types of connections require an IP address in order to perform GIS authentication. Therefore, after the initial connection is made with an optional 802.1X detection, if DHCP discovery is performed and an IP-Address is received (without an 802.1X response), this network is clearly not an 802.1X network and only GIS may be available to control network access. To verify this, the client 202 issues an Internet Detection via HTTP to yahoo.com as per the GIS specification. If yahoo is received and confirmed, this is a free or Open network. If the internet HTTP request is redirected, the client 202 should receive the appropriate GIS (or proprietary derivative method) response XML in the HTTP reply. Visibility of these GIS Reply Messages to a client user-agent request indicates a high probability of a trusted network.

Detecting Wired Broadband Service Availability

When a Broadband adapter signals an active link, it may be characterized for both 802.1X and IP in the same manner as a Wi-Fi adapter after it has successfully associated (802.11 authenticated) to the Access Point. By leveraging this network event on the Ethernet adapter to signal a series of characterizations, it can be determined whether the interface supports 802.1X and if so, does it reside on the corporate LAN (via EAP characterization and network detection) or if the network provides IP to the Internet or controlled by GIS. Assuming the Ethernet adapter is provided with an IP, the client 202 can leverage its existing mechanism for detecting the internet, but rather than failing to detect the internet, may detect and scrutinize any redirects presented by the network for the appropriate GIS tags. This assessment also includes detecting and compensating for GIS proprietary derivatives such as Wayport, Intertouch or Nomadix modes since they are presented in the Initial Redirect Response Message as a result of the HTTP request.

Shared WEP Detection and Verification

For simple WEP networks, such as Personal Wireless, detection of the SSID may indicate that this network has a WEP key associated with it. If the WEP key is incorrect, the client will not authenticate with the Access Point and association will not occur. To verify that the SSID detected by either passive or active scan methods is authentic, the client 202 may make a sample WEP association with the Access Point. In one embodiment, if 802.11-authenticated association occurs, there is a high probability that the network is authentic and should be displayed to the user. DHCP and GIS discovery may be optionally performed for WEP-secured GIS Access Gateway implementation to determine if a viable IP service is available in cases where other methods besides WEP are supported and stations without the proper shared WEP key are allowed to remain associated to the Access Point.

RADIUS NAI and Peering Discovery

For both classified and unknown networks verified as WPA or 802.1X, further authenticity checking can be performed by initiating an 802.1X authenticating using a tunneled EAP method such as PEAP or TTLS. If properly provisioned, all networks, both corporate and Public access should respond to any EAP request with an expected NAI decoration in the User-Name of the EAPOL Identity Response. If a handling Enterprise AAA proxy or Aggregator AAA proxy is resident on the network, it will respond with a RADIUS challenge and thus a matching 802.1X EAP Request back to the client 202. In this way, public access and corporate networks can "advertise" service availability via 802.1X whether the SSID is recognized or not the advertisement only needs to be solicited for by the client 202. For corporate network advertisement, the corporate AAA system would need to be configured to recognize and handle a given prefix (e.g., "IPASSP") in the same manner as corporate RADIUS domains. However, in cases where PEAP is used, even with termination at the aggregator, and conversion from EAP-MSCHAP-V2 to standard MSCHAP-V2, this configuration step should be done to maintain integrity of the CHAP responses and could also therefore be used for purposes of network service advertisement via characterization.

802.1X AAA is typically handled by the Access Point and not by an intermediary Access Gateway. As such, the AAA streams used for each service type can (and most likely will) be "split"; one for each service set. By using a network-based service advertisement scenario with characterization by the client 202, different network AAA capability sets may be discovered and selected, leveraging NAI construction principles carried with the client in its service directory. Each aggregation prefix or suffix, e.g. "IPASS/" and "IPASSIX/" carries with it certain assumptions as to the behavior, services support and security, while maintaining backwards compatibility for previous non-EAP services and simplifying network provisioning by the provider.

An example of NAI construction service selection would be deploying one prefix specific to the trusted central server 216 which routes to an aggregator AAA server that requires mutual certificate authentication while another is used for End-to-End EAP methods and yet another is a simple standard RADIUS proxy. Each selection has specific characteristics and policies to regulate the proper behavior based on what protocols are passed over it—standard RADIUS, Standard EAP RADIUS, Tunneled EAP RADIUS, Aggregator-Terminated Tunneled EAP RADIUS.

Network Certificate Validation

Networks which respond to both an EAPOL-Start and subsequent 802.1X TTLS Request formatted with a known aggregation identifier (e.g., "iPASS/") will attempt to negotiate a TLS certificate to complete phase 1 of the TTLS request. Completing the SSL handshake and validating the received server-side certificate against the appropriate Certification Root Authority Certificate residing within the client 202 can absolutely validate the authenticity and availability of services on the network.

Enterprise Certificate Validation

Enterprise network authenticity characterization operates in the same manner as Public Access Service characterization over 802.1X. Home Authentication Servers provisioned to recognize an "IPASS/" formatted NAI TTLS request will respond in the same manner as an aggregator AAA server and present a server-side certificate for validation by the client 202. The certificate may carry vendor-specific signing information or the trusted central server 216 may verify the content of any field (like the Common Name) presented in the certificate or trusted central server 216 may simply rely on the presence of the proper Root Certification Authority that the enterprise has provisioned and distributed to the client. On successful validation of the certificate in combination with the detected network SSID, the client 202 establishes a high confidence that the client device is attached to the Enterprise's Home WLAN network and may initiate different policy-based behaviors accordingly. Examples of this "network specific policy" are automatic network login, automated software or phonebook updates, patch management and remediation or custom PFW and VPN settings applied only to when the client is on the home network.

Characterizing Unknown Networks

For networks which are positively identified as untrusted service enabled via characterization (no valid aggregator AAA server or certificate information found in combination with an unknown SSID for wireless services), the client 202 may provide the optional ability to display these untrusted or unknown networks as available and facilitate the connection in a controlled manner.

Taking Windows XP as a model, the client 202 may know enough about the network environment to lead the user through the connectivity event, even without pre-configured knowledge of the network's information, such as a WEP key.

Taking information from the Access Point's broadcast beacon, the client 202 can determine what capability sets are enabled on the network. Beyond that, further network characterization to uncover additional capabilities (such as 802.1X support) can be performed in order to provide the user with exactly what is necessary to connect. For instance, if the privacy bit is set in the Wi-Fi beacon, typically indicating that WEP is enabled on the Access Point, it can't be readily established that 802.1X is used to dynamically transmit the WEP key or whether the user must enter the appropriate WEP key in order to gain access to the network. Therefore, using the principles of WEP security with 802.1X detection, the client 202 can set an arbitrary WEP key in order to determine if 802.1X is present and then prompt the user to enter credentials and Authentication Method. If client 202 is unable to associate with the Access Point, it most likely requires a static WEP key to be entered by the end-user in order to connect which can then be presented to the user in a dialog.

WPA can be presented in the same manner. Once it is established that an EAPOL-Start is handled or a WPA pre-shared key is required to connect, the user can be prompted for the appropriate information. If GIS or a derivative protocol is detected, but coming from a network with an unrecognized SSID, a dialog can be provided to the user to enter the appropriate account information required to connect without an Authentication Protocol requirement.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "example embodiment" or "exemplary embodiment" means that the embodiment being referred to serves as an example or illustration.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A non-transitory machine-readable storage medium including instructions which when executed by a computer cause the computer to perform operations for classifying a network, the operations comprising:
   detecting, by a client executing on the computer, a network indicator associated with the network, the network provided by a network provider;
   classifying the network as being in one of a plurality of network classes based on the network indicator and stored network information;
   after the classifying, verifying whether the network is correctly classified into the one of the plurality of network classes, the verifying comprising,
      interacting with a component associated with the network to receive an actual attribute of the network;
      determining an expected attribute for the network, wherein the expected attribute is derived from the network indicator associated with the network; and
      determining whether the expected attribute matches the actual attribute;
   in response to determining the actual attribute matches the expected attribute, determining that the network is correctly classified; and
   in response to determining the actual attribute does not match the expected attribute, reclassifying, based on an interaction with the component and the actual attribute, the network into another one of the plurality of network classes.

2. The non-transitory machine-readable storage medium of claim 1, the operations further comprising:
   after classifying the network as being in the one of the plurality of network classes, connecting to the network without user input.

3. The non-transitory machine-readable storage medium of claim 1, the operations further comprising:
   presenting, in a graphical user interface controlled by the client, an icon indicating the network is available for a full network connection;
   establishing, in response to user input, the full network connection between the computer and the network.

4. The non-transitory machine-readable storage medium of claim 1, the operations further comprising:
   after classifying the network as being in the one of the plurality of network classes, precluding presentation of an icon indicating the network is available for connection.

5. The non-transitory machine-readable storage medium of claim 1, the operations further comprising:
   obtaining, via interaction with the network provider, another actual attribute of the network; and
   determining that the stored network information about the network includes another expected attribute that matches the another actual attribute;
   classifying the network into a different one of the plurality of network classes based on the another actual attribute.

6. The non-transitory machine-readable storage medium of claim 5, the operations further comprising:
   after classifying the network into the different one of the plurality of network classes, precluding presentation of an icon indicating that the network is available for connection.

7. The non-transitory machine-readable storage medium of claim 5, the operations further comprising:
   after classifying the network into the different one of the plurality of network classes, displaying an icon indicating the network is available for connection.

8. The non-transitory machine-readable storage medium of claim 1, wherein the network indicator is a Service Set Identifier.

9. The non-transitory machine-readable storage medium of claim 1, wherein the network indicator is a network address.

10. The non-transitory machine-readable storage medium of claim 1, wherein the actual attribute is selected from the group consisting of a Media Access Control address of the network attachment point, media access control address of a network-resident component, IP address of a network-resident component, VLAN association, and Wireless Equivalent Privacy key.

11. The non-transitory machine-readable storage medium of claim 1, wherein the actual attribute includes an identity certificate.

12. The non-transitory machine-readable storage medium of claim 1, wherein the network indicator is a device identifier.

13. The non-transitory machine-readable storage medium of claim 1, wherein the plurality of network classes include trusted network or untrusted network.

14. The non-transitory machine-readable storage medium of claim 1, wherein the plurality of network classes include public access networks, known private networks, discovered corporate networks, and untrusted networks.

15. A computer-implemented method comprising:
   receiving, in a computer, a network indicator associated with a network;
   classifying the network into one of a plurality of network classes, the classifying based on the network indicator and stored network information;
   presenting, on a display of the computer, a first indication that the network is classified into the one of a plurality of network classes;
   verifying whether the network is correctly classified into the one of the plurality of network classes, the verifying including interacting with a component associated with the network; and
   if the network has been incorrectly classified in the one of the plurality of network classes,
      reclassifying, based on an interaction with the component and the stored network information, the network into another one of the plurality of network classes;
      presenting, on the display, a second indication that the network belongs in the other one of the plurality of network classes;
      precluding a connection between the computer and the network;
   if the network has been correctly classified, facilitating a connection between the computer and the network.

16. The computer-implemented method of claim 15, wherein the interacting includes:
   receiving an identity certificate from an aggregator; and
   authenticating the identity certificate.

17. The computer-implemented method of claim 15, wherein the interacting includes:
   receiving an identity certificate from the component; and
   authenticating the identity certificate.

18. The computer-implemented method of claim 15, wherein the interacting includes:
   receiving one or more network attributes; and
   comparing the one or more network attributes to one or more stored attributes.

19. The computer implemented method claim 15, wherein the plurality of network classes include a trusted network class and an untrusted network class.

20. The computer-implemented method of claim 15, wherein the plurality of network classes include public access networks, known private networks, discovered corporate networks, and untrusted networks.

* * * * *